United States Patent
Hasegawa et al.

(10) Patent No.: US 10,169,346 B2
(45) Date of Patent: Jan. 1, 2019

(54) FILE MIGRATION IN A HIERARCHICAL STORAGE SYSTEM

(71) Applicant: International Business Machines Corporation, Armonk, NY (US)

(72) Inventors: Tohru Hasegawa, Tokyo (JP); Sosuke Matsui, Yokohama (JP); Shinsuke Mitsuma, Tokyo (JP); Tsuyoshi Miyamura, Yokohama (JP); Noriko Yamamoto, Tokyo (JP)

(73) Assignee: International Business Machines Corporation, Armonk, NY (US)

(*) Notice: Subject to any disclaimer, the term of this patent is extended or adjusted under 35 U.S.C. 154(b) by 443 days.

(21) Appl. No.: 14/822,068

(22) Filed: Aug. 10, 2015

(65) Prior Publication Data
US 2017/0046351 A1    Feb. 16, 2017

(51) Int. Cl.
*G06F 17/30* (2006.01)

(52) U.S. Cl.
CPC .. *G06F 17/30079* (2013.01); *G06F 17/30194* (2013.01)

(58) Field of Classification Search
CPC ............... G06F 17/30079; G06F 17/30194
See application file for complete search history.

(56) References Cited

U.S. PATENT DOCUMENTS

| | | | |
|---|---|---|---|
| 6,269,382 B1 | 7/2001 | Cabrera et al. | |
| 6,442,601 B1* | 8/2002 | Gampper | H04L 29/06 709/218 |
| 7,343,446 B2 | 3/2008 | Pudipeddi et al. | |
| 7,937,453 B1* | 5/2011 | Hayden | G06F 17/30203 707/607 |
| 8,566,517 B1* | 10/2013 | Sims | G06F 3/065 360/72.1 |
| 8,850,110 B2 | 9/2014 | Matsuo et al. | |
| 9,852,150 B2 | 12/2017 | Sharpe et al. | |
| 2013/0227236 A1* | 8/2013 | Flynn | G11C 16/26 711/165 |
| 2018/0165035 A1 | 6/2018 | Kavuri et al. | |

OTHER PUBLICATIONS

Mueller-Wicke, Dominic, "TSM for Space Management 6.4 Update & best practices TSM—GPFS Integration", TSM Development / Apr. 2013, IBM Software, Tivoli software, © Copyright IBM Corporation 2013, pp. 1-44.

* cited by examiner

*Primary Examiner* — Apu M Mofiz
*Assistant Examiner* — Husam Turki Samara
(74) *Attorney, Agent, or Firm* — Steven E. McDaniel; Brian M. Restauro

(57) ABSTRACT

A method, executed by at least one processor, includes receiving a migration request for a plurality of files, assigning files of the plurality of files that are smaller than a selected size to one or more small-file secondary storage devices, assigning files of the plurality of files that are larger than the selected size to one or more large-file secondary storage devices, and initiating migration of the plurality of files from one or more primary storage devices to the secondary storage devices to which they are assigned. A corresponding computer program product and computer system are also disclosed herein.

20 Claims, 4 Drawing Sheets

FILE MIGRATION IN A HIERARCHICAL STORAGE SYSTEM

BACKGROUND OF THE INVENTION

The present invention relates generally to storage systems and specifically to file migration in hierarchical storage systems.

Hierarchical storage systems support migration operations that transfer data from a primary storage device to a secondary storage device and recall operations that transfer data from a secondary storage device to a primary storage device. While migration operations may be conducted as a background process well after a client writes the data to the primary storage device, recall operations are preferably conducted immediately in order to provide a timely response to the client that needs to access the data.

SUMMARY

As disclosed herein a method, executed by at least one processor, includes receiving a migration request for a plurality of files, assigning files of the plurality of files that are smaller than a selected size to one or more small-file secondary storage devices, assigning files of the plurality of files that are larger than the selected size to one or more large-file secondary storage devices, and initiating migration of the plurality of files from one or more primary storage devices to the secondary storage devices to which they are assigned.

A corresponding computer program product is also disclosed herein. In one embodiment, the computer program product includes one or more computer readable storage media and program instructions stored on the one or more computer readable storage media, the program instructions comprising instructions to receive a migration request for a plurality of files, assign files of the plurality of files that are smaller than a selected size to one or more small-file secondary storage devices, assign files of the plurality of files that are larger than the selected size to one or more large-file secondary storage devices, and initiate migration of the plurality of files to the secondary storage devices to which they are assigned.

A corresponding computer system is also disclosed herein. In one embodiment, the computer system includes one or more computers, a primary storage device, a plurality of secondary storage devices that are partitioned into one or more large-file secondary storage devices and one or more small-file secondary storage devices, and the above mentioned computer program product.

DETAILED DESCRIPTION

Figure 1:
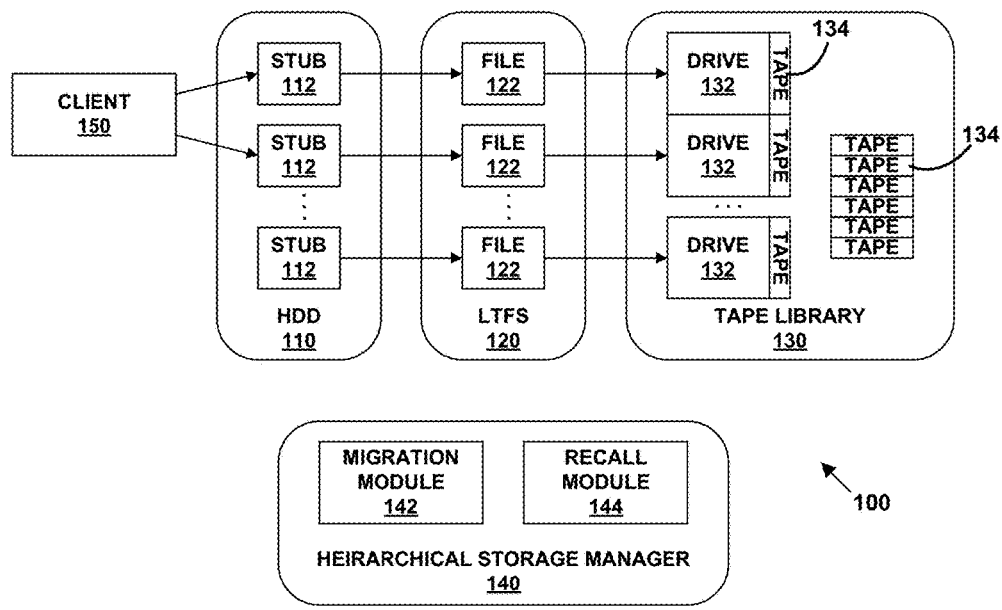
FIG. 1 is a block diagram depicting one example of a hierarchal storage system wherein at least one embodiment of the claimed invention may be utilized.

The embodiments disclosed herein improve the responsiveness of recall operations in storage systems, such as hierarchical storage systems, that migrate data to secondary storage devices. For example, FIG. 1 is a block diagram depicting one example of a hierarchal storage system 100 wherein at least one embodiment of the claimed invention may be utilized. As depicted, the hierarchal storage system 100 includes one or more primary storage devices 110, a file system 120, a storage library 130, a hierarchical storage manager 140, and one or more clients 150. The hierarchical storage system 100 enables migration operations that transfer data (e.g., files) from the primary storage devices 110 to the storage library 130 and recall operations that transfer data from the storage library 130 to the primary storage devices 110.

The storage library 130 may include multiple secondary storage devices 132. The primary storage devices 110 may provide faster access to data stored thereon than the storage devices 132 of the storage library 130. However the storage library 130 may be able to store significantly more data that the primary storage devices 110. Consequently, the primary storage devices 110 preferably only retain data that is currently being accessed by the clients 150.

The file system 120 may track the status of files 122 that are stored by the hierarchal storage system 100 on behalf of the clients 150. The file system 120 may enable clients 150 such as application servers to use the hierarchal storage system 100 by accessing the primary storage devices 110 in a conventional manner, i.e., without knowledge of the storage library 130 and the interactions between the primary storage devices 110 and the storage library 130.

For example, files 122 may be represented on the primary storage devices 110 as file stubs 112 that point to a file 122 within the file system 120. When a client 150 attempts to access the file stub 112, for example by opening a file, the hierarchical storage manager 140 may issue a recall operation (e.g., via a recall module 144) that pulls at least a portion of the data corresponding to the file 122 from the storage library 130 into a temporary local file (not shown) on the primary storage device 110. For example, the storage library 130 may mount a selected storage medium 134 that contains data corresponding to the file 122 onto a drive 132 so that the data can be transferred to the primary storage device 110. The data may be modified by the client 150 on primary storage device 110 and migrated back to the same, or a different storage medium 134, as directed by the hierarchical storage manager 140 (e.g., via a migration module 142).

The secondary storage devices 132 may be partitioned into one or more large-file secondary storage devices and one or more small-file secondary storage devices. In some embodiments, the migration module 142 is configured to receive a migration request for a selected file and initiate migration of the selected file from the primary storage device to one of the small-file secondary storage devices if the requested file is smaller than a selected size and to one of the large-file secondary storage device if the requested file is larger than the selected size.

In the depicted embodiment, each primary storage device 110 is a hard disk drive (HDD), the file system 120 is a linear tape file system (LTFS), the storage library 130 is a tape library, and the secondary storage devices 132 are tape drives. The LTFS enables applications (not shown) executing on the clients 150 to access the files 122 using conventional HDD system calls. However, if an application for an HDD is actually made to operate using the LTFS directly without being modified, accessing a file may take more time than expected and the HDD system calls may timeout and the application be unable to access the file. To prevent such a situation, the hierarchy storage system 100 includes the primary storage devices 110 and the LTFS 120 and tape library 130 are used as secondary storage.

In some embodiments, the hierarchical storage system 100 enables a client 150 to designate a pool of storage media 134 in the storage library 130 as a target of migration for a set of files 122. If multiple secondary storage devices 132 are available it is possible to migrate multiple files 122 concurrently by causing the secondary storage devices 132 to mount storage media 134 included in the pool. By performing migration using the secondary storage devices 132 the time required to complete migration is shortened. Consequently, migration is typically performed using all the available secondary storage devices 132 so as to minimize the time required to complete migration.

However, when migration is performed using all the available secondary storage devices 132, if a recall request occurs in response to access to the primary storage device 110 by a client 150, the hierarchical storage system 100 recognizes that interrupting a migration operation to service the recall request typically requires unmounting and unloading at least one storage medium 134 that must later be loaded and mounted to finish the migration operation. Consequently, the hierarchical storage system 100 recognizes that interrupting migration operations to perform recall operations can significantly degrade the performance of the hierarchical storage system 100.

Figure 2:
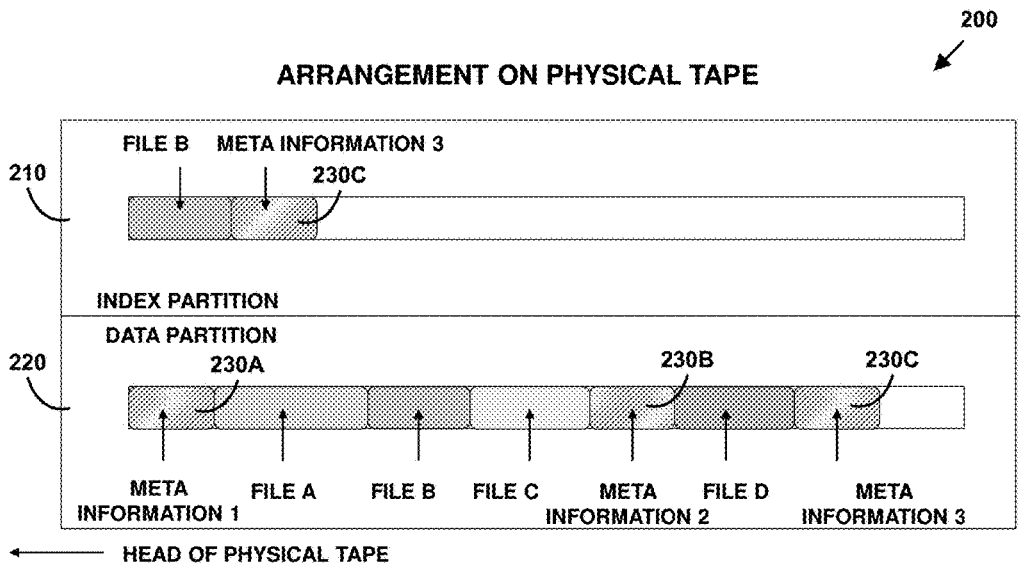
FIG. 2 is format diagram of one example of a data storage medium in accordance with at least one embodiment of the claimed invention.

FIG. 2 is format diagram of one example of a data storage medium 200 in accordance with at least one embodiment of the claimed invention. The depicted data storage medium 200 includes an index partition 210 and a data partition 220. The depicted data storage medium 200 is representative of a conventional LTFS (tape) medium.

In the index partition 210, meta information such as allocation information of a file is recorded, while in the data partition 220, a body of data is recorded. Since the allocation information is frequently updated and the tape is a sequential medium, a meta information field 230 is appended to the tail of the data partition 220 as it is updated. The depicted example includes three meta information fields 230 (i.e., 230A, 230B, and 230C). To eliminate the need to access the tail of the data partition 220 during mounting operations, the index partition 210 may be updated with the most recent version of the meta information field (i.e., meta information 230C in the depicted example) after the data storage medium 200 is unmounted. Accordingly, with the depicted data storage medium 200 allocation information can be read from the index partition when the tape cartridge is mounted.

To be precise, the meta information is also written in the data partition, and even when the meta information in the index partition cannot be updated due to sudden power discontinuity or the like, the tape cartridge can be mounted based on the meta information recorded in the data partition although it takes time.

Further, it is also possible to store a small volume of data in the index partition. This enables data that is desired to be read at the same time as the tape cartridge being mounted, to be read from the index partition at high speed by writing the data also in the index partition as well as in the data partition. FIG. 2 illustrates a specific example. In this example, in the index partition, a particularly designated file (file B) and the latest meta information (meta information 230C) are recorded, while, in the data partition, meta information 230A, 230B and 230C as well as data (file A, file B, file C and file D) are recorded.

Figure 3A:
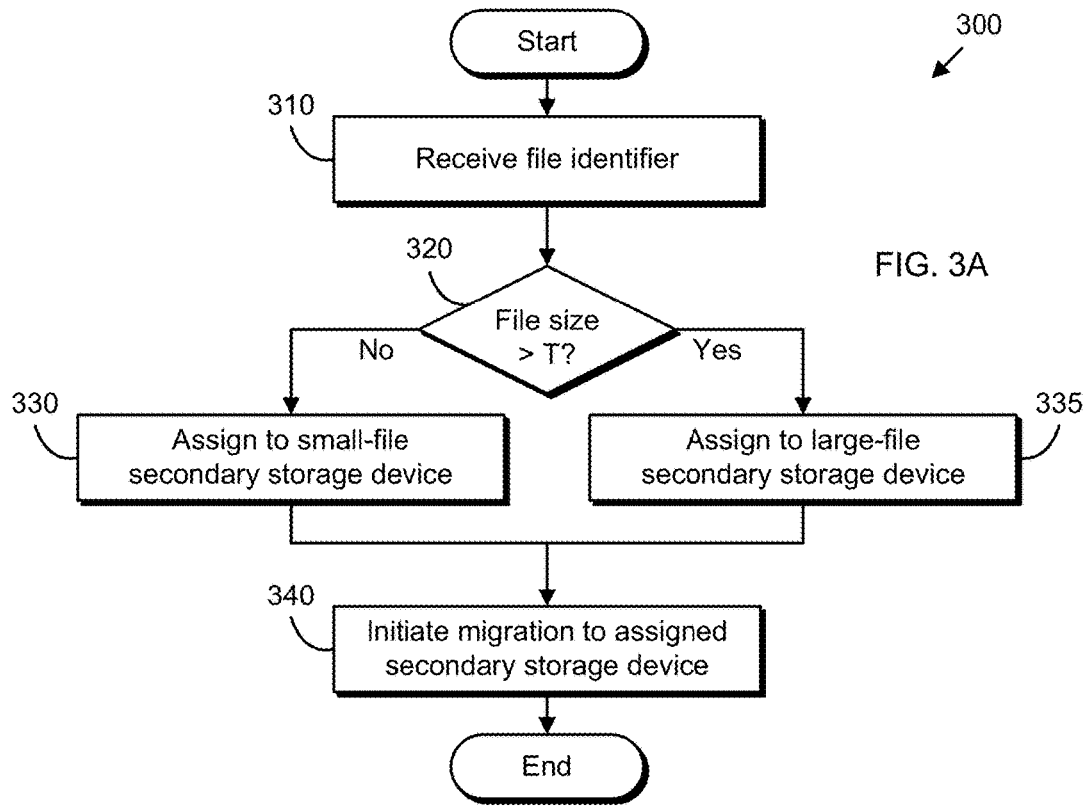
FIG. 3A is flowchart depicting one example of a migration event handler in accordance with at least one embodiment of the claimed invention.

FIG. 3A is flowchart depicting one example of a migration event handler 300 in accordance with at least one embodiment of the claimed invention. As depicted, the migration event handler 300 includes the operations of receiving (310) a file identifier, determining (320) a file size, assigning (330) to a small-file secondary storage device or assigning (340) to a large-file secondary storage device, and initiating (340) migration. The migration event handler 300 may be conducted by the migration module 142 in response to migration requests or other requests from various actors. For example, the hierarchical storage manager 140 may determine that a file 122 is no longer being accessed by the client 150 and initiate the migration request, or the client 150 may close the file 122 or initiate some other request including an explicit migration request.

Receiving (310) a file identifier may include receiving a file handle, pathname, search string, or other identifier used to specify one or more files that are to be migrated. Determining (320) a file size may include accessing information stored by the file system 120 and determining whether the file is larger than a specified threshold (T). If the file size is not larger than T, the depicted method proceeds by assigning (330) the file to a small-file secondary storage device. Conversely, if the file size is larger than T, the depicted method proceeds by assigning (340) the file to a large-file secondary storage device.

Subsequent to assigning the file to a small-file secondary storage device or a large-file secondary storage device, the method proceeds by initiating (340) migration of the file. In some embodiments, migration of the file can be initiated with a function call to the file system 120. In response thereto, the file system 120 may read data from a temporary file on the primary storage device 110 and transfer the data to the assigned secondary storage device.

Figure 3B:
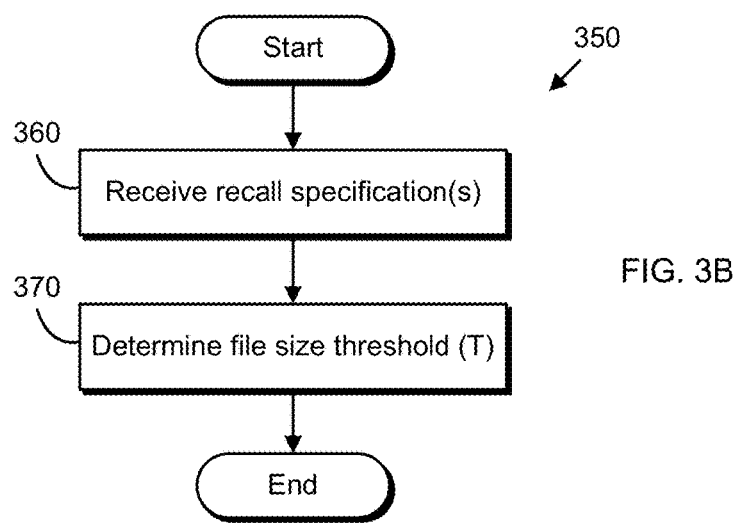
FIG. 3B is flowchart depicting one example of a threshold determination method in accordance with at least one embodiment of the claimed invention.

FIG. 3B is flowchart depicting one example of a threshold determination method 350 in accordance with at least one embodiment of the claimed invention. As depicted, the threshold determination method 350 includes receiving (360) one or more recall specifications, and determining (370) a file size threshold T. The file size threshold T may be a system level parameter or associated with a specific set of files.

In the depicted embodiment, the recall specifications are used to automatically compute the file size threshold. For example, the recall specifications may include a desired average recall time ($tr_{avg}$) and the file size threshold T is computed according to the equation:

$$T = \{\text{average file transfer speed}\} \cdot (tr_{avg} - to_{avg}) \quad (1)$$

where $to_{avg}$ is the average migration overhead time for a file. For example, in one embodiment, $to_{avg}$ is computed according to the equation:

$$to_{avg} = \{\text{avg. unmounting time}\} + \{\text{avg. unloading time}\} + \{\text{avg. loading time}\} + \{\text{avg. mounting time}\} + \{\text{avg. seek time}\} \quad (2)$$

The depicted method 350 enables automatic determination of the file size threshold T. In another embodiment, the file size threshold T is manually entered by a system administrator or the like.

Figure 4:
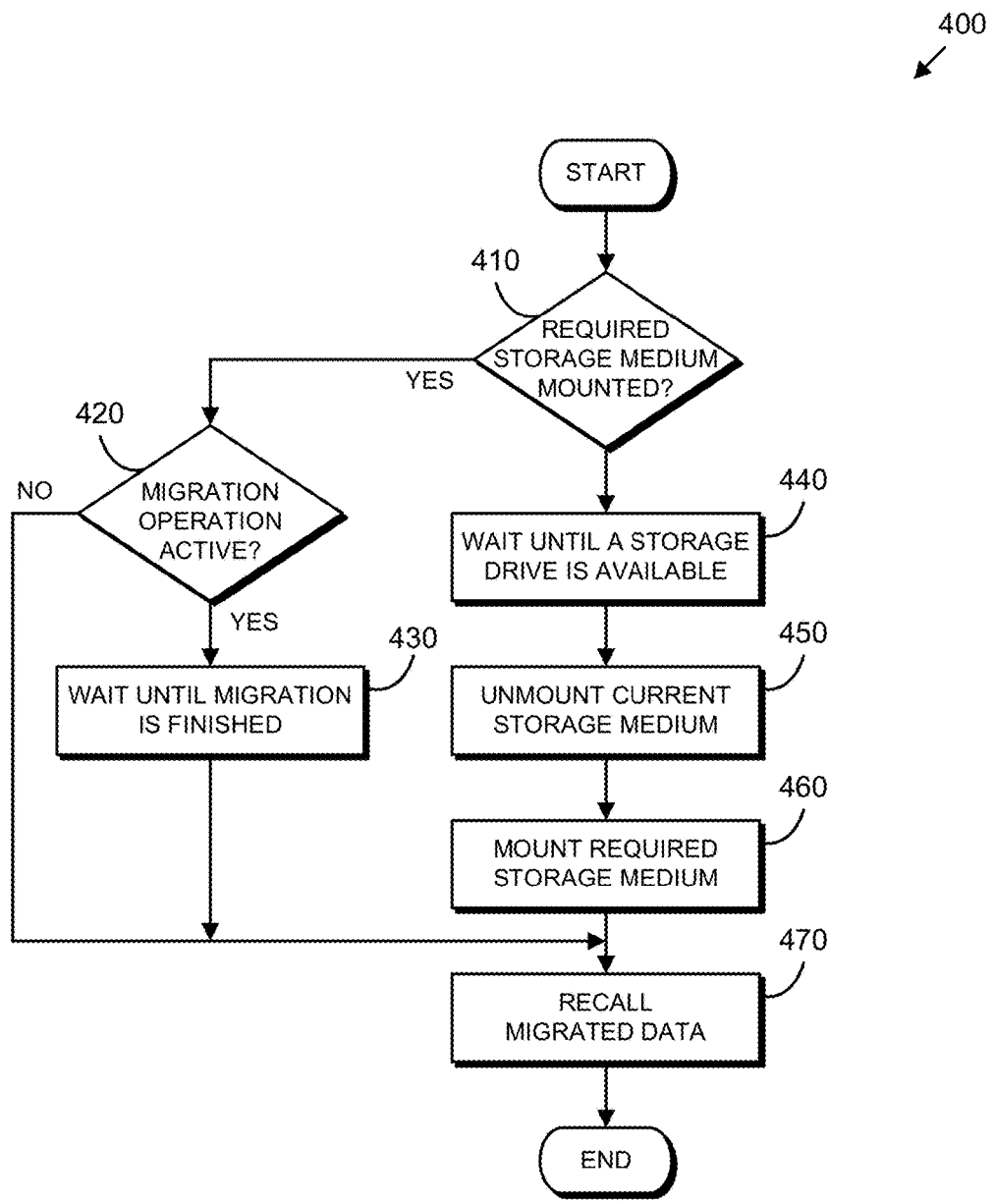
FIG. 4 is flowchart depicting one example of a recall event handler in accordance with at least one embodiment of the claimed invention.

FIG. 4 is flowchart depicting one example of a recall event handler 400 in accordance with at least one embodiment of the claimed invention. As depicted the recall event handler 400 includes determining (410) whether a required storage medium is mounted, determining (420) whether a migration operation is active, waiting (430) until the migration is finished, waiting (440) until a storage drive is available, unmounting (450) the current storage medium, mounting (460) a required storage medium, and recalling (470) migrated data. The recall event handler 400 may be conducted by the hierarchical storage manager 140 or the like in response to a request to recall a particular file.

One of skill in the art will appreciate that, as described herein, files that are assigned to a small-file secondary storage device may experience a significantly reduced average waiting period and maximum waiting period for the waiting operation 430 and the waiting operation 440 due to the relative speed with which such files may be migrated. Furthermore, when the probability of the existence of a file of a particular size is reduced as the size of the file increases, as is frequently the case in data processing, the number of large files in a storage system may be much lower that the number of small files. Consequently, the expected wait time for the waiting operation 430 may be reduced for all files.

For example, assuming a migration bandwidth of 160 MB/s, migration of 100 GB of data would require approximately 10 minutes to complete while migration of 1 GB of data would take approximately 6 seconds to complete. To continue the example, assume also that a storage system, such as the hierarchical storage system 100, is equipped with just two storage drives 132 and that a recall event occurs while 20 1 GB files and two 10 GB files are earmarked for migration. Using conventional migration methods, the possibility exists for the assumed scenario that each of the 10 GB files are currently being migrated to the storage drives 132. Consequently, a recall operation would be required to wait up to 10 minutes before the data transfer operations corresponding to the recall could proceed. In contrast, with the embodiments disclosed herein the 10 GB files would be migrated to a storage drive dedicated to large files and the 1 GB files would be migrated to a storage drive dedicated to small files. Consequently, the maximum time a recall operation would be required to wait for a storage drive would be approximately 6 seconds under the assumed scenario.

Figure 5:
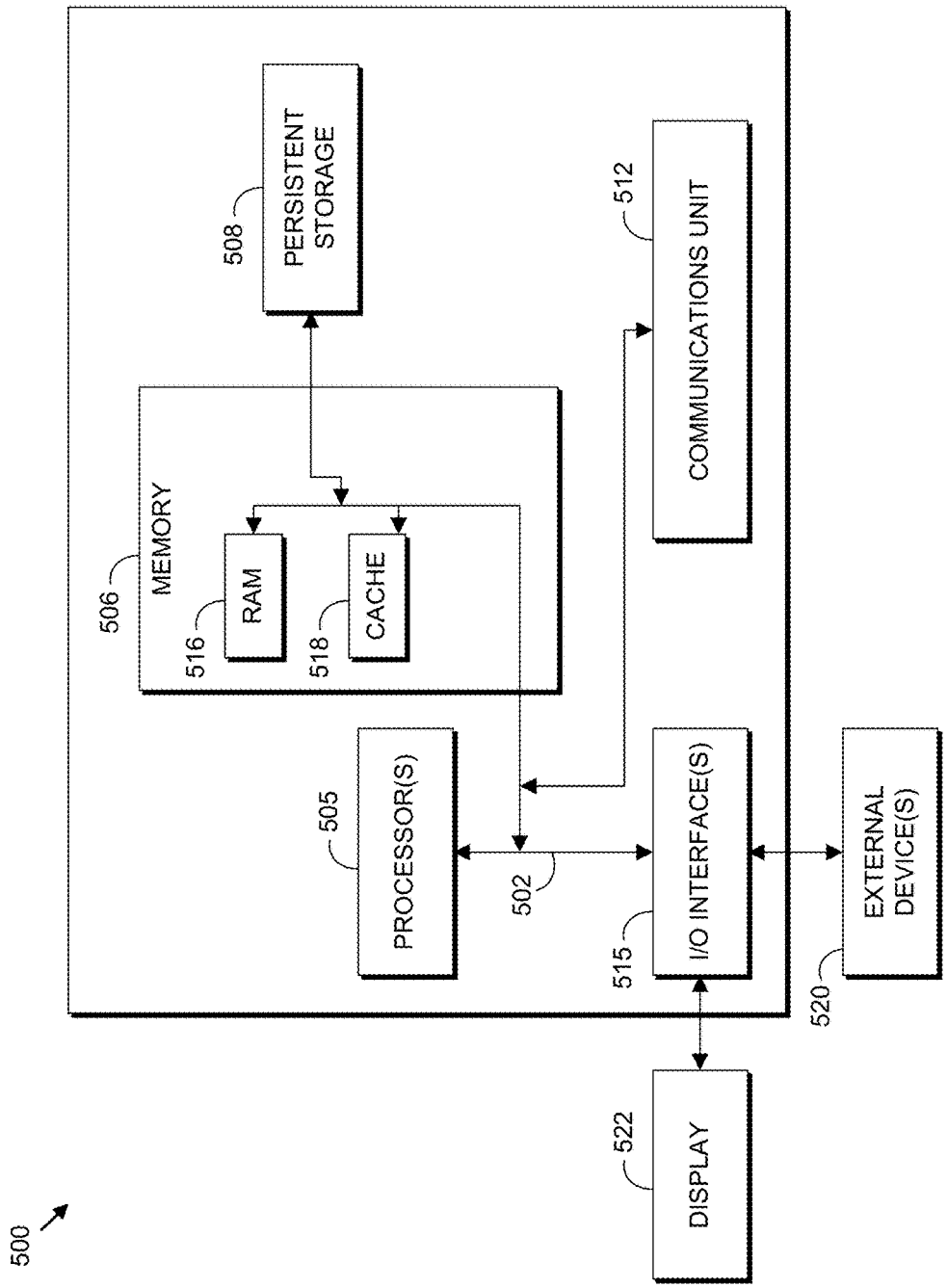
FIG. 5 is a block diagram depicting one example of a computing apparatus (e.g., computer) suitable for executing the methods disclosed herein.

FIG. 5 is a block diagram depicting one example of a computing apparatus (i.e., computer 500) suitable for executing the methods disclosed herein. It should be appreciated that FIG. 5 provides only an illustration of one embodiment and does not imply any limitations with regard to the environments in which different embodiments may be implemented. Many modifications to the depicted environment may be made.

As depicted, the computer 500 includes communications fabric 502, which provides communications between computer processor(s) 505, memory 506, persistent storage 508, communications unit 512, and input/output (I/O) interface(s) 515. Communications fabric 502 can be implemented with any architecture designed for passing data and/or control information between processors (such as microprocessors, communications and network processors, etc.), system memory, peripheral devices, and any other hardware components within a system. For example, communications fabric 502 can be implemented with one or more buses.

Memory 506 and persistent storage 508 are computer readable storage media. In the depicted embodiment, memory 506 includes random access memory (RAM) 516 and cache memory 518. In general, memory 506 can include any suitable volatile or non-volatile computer readable storage media.

One or more programs may be stored in persistent storage 508 for execution by one or more of the respective computer processors 505 via one or more memories of memory 506. The persistent storage 508 may be a magnetic hard disk drive, a solid state hard drive, a semiconductor storage device, read-only memory (ROM), erasable programmable read-only memory (EPROM), flash memory, or any other computer readable storage media that is capable of storing program instructions or digital information.

The media used by persistent storage 508 may also be removable. For example, a removable hard drive may be used for persistent storage 508. Other examples include optical and magnetic disks, thumb drives, and smart cards that are inserted into a drive for transfer onto another computer readable storage medium that is also part of persistent storage 508.

Communications unit 512, in these examples, provides for communications with other data processing systems or devices. In these examples, communications unit 512 includes one or more network interface cards. Communications unit 512 may provide communications through the use of either or both physical and wireless communications links.

I/O interface(s) 515 allows for input and output of data with other devices that may be connected to computer 500. For example, I/O interface 515 may provide a connection to external devices 520 such as a keyboard, keypad, a touch screen, and/or some other suitable input device. External devices 520 can also include portable computer readable storage media such as, for example, thumb drives, portable optical or magnetic disks, and memory cards.

Software and data used to practice embodiments of the present invention can be stored on such portable computer readable storage media and can be loaded onto persistent storage 508 via I/O interface(s) 515. I/O interface(s) 515 may also connect to a display 522. Display 522 provides a mechanism to display data to a user and may be, for example, a computer monitor.

One of skill in the art will appreciate that the above disclosed embodiments may be adapted for a variety of environments and applications. Furthermore, the programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The embodiments disclosed herein include a system, a method, and/or a computer program product. The computer program product may include a computer readable storage medium (or media) having computer readable program instructions thereon for causing a processor to carry out the methods disclosed herein.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It should be noted that this description is not intended to limit the invention. On the contrary, the embodiments presented are intended to cover some of the alternatives, modifications, and equivalents, which are included in the spirit and scope of the invention as defined by the appended claims. Further, in the detailed description of the disclosed embodiments, numerous specific details are set forth in order to provide a comprehensive understanding of the claimed invention. However, one skilled in the art would understand that various embodiments may be practiced without such specific details.

Although the features and elements of the embodiments disclosed herein are described in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A method, executed by at least one processor, the method comprising:
   receiving a migration request for a plurality of files;
   determining a file size threshold for the plurality of files based on an average recall time, average transfer speed for migrating a file, and an average migration overhead time to transfer the file;
   assigning files of the plurality of files that are smaller than the file size threshold to one or more small-file secondary storage devices;
   assigning files of the plurality of files that are larger than the file size threshold to one or more large-file secondary storage devices;
   and initiating migration of the plurality of files front one or more primary storage devices to the secondary storage devices to which they are assigned.

2. The method of claim 1, wherein the migration request is generated in response to closing a file on the primary storage device.

3. The method of claim 1, wherein the selected size is automatically determined from at least one recall specification.

4. The method of claim 3, wherein the recall specification is selected from the group consisting of a file transfer speed, an unmounting time, an unloading time, a loading time, a mounting time, and a seek time.

5. The method of claim 1, wherein initiating migration comprises invoking a file system function call.

6. The method of claim 1, wherein the secondary storage devices correspond to a storage library.

7. The method of claim 6, wherein the secondary storage devices are managed by a linear media file system.

8. A computer program product comprising:
   one or more computer readable storage media and program instructions stored on the one or more computer readable storage media, the program instructions comprising instructions to: receiving a migration request for a plurality of files;
   determining a file size threshold for the plurality of files based on an average recall time, average transfer speed for migrating a file, and an average migration overhead time to transfer the file;
   assigning files of the plurality of files that are smaller than the file size threshold to one or more small-file secondary storage devices;
   assigning files of the plurality of files that are larger than the file size threshold to one or more large-file secondary storage devices;
   and initiating migration of the plurality of files from one or more primary storage devices to the secondary storage devices to which they are assigned.

9. The computer program product of claim 8, wherein the migration request is generated in response to closing a file on the at least one primary storage device.

10. The computer program product of claim 8, wherein the program instructions comprise instructions to automatically determine the selected size from at least one recall specification.

11. The computer program product of claim 10, wherein the recall specification is selected from the group consisting of a file transfer speed, an unmounting time, an unloading time, a loading time, a mounting time, and a seek time.

12. The computer program product of claim 8, wherein the instructions to initiate migration invoke a file system function call.

13. The computer program product of claim 8, wherein the secondary storage devices correspond to a storage library.

14. The computer program product of claim 8, wherein the secondary storage devices are managed by a linear media file system.

15. A computer system comprising:
   one or more computers; a primary storage device;
   a plurality of secondary storage devices that are partitioned into one or more large-file secondary storage devices and one or more small file secondary storage devices; and one or more computer readable storage media and program instructions stored on the one or more computer readable storage media for execution by at least one of the computers, the program instructions comprising instructions to:
   receiving a migration request for a plurality of files;
   determining a file size threshold for the plurality of files based on an average recall time, average transfer speed for migrating a file, and an average migration overhead time to transfer the file;
   assigning files of the plurality of files that are smaller than the file size threshold to one or more small-file secondary storage devices; assigning files of the plurality of files that are larger than the file size threshold to one or more large-file secondary storage devices;
   and initiating migration of the plurality of files from one or more primary storage devices to the secondary storage devices to which they are assigned.

16. The computer system of claim 15, wherein the secondary storage devices correspond to a storage library.

17. The computer system of claim 16, wherein the secondary storage devices are managed by a file system.

18. The computer system of claim 17, wherein the file system is a linear media file system.

19. The computer system of claim 16, wherein the storage library further comprises a plurality of mountable media.

20. The computer system of claim 15, wherein the plurality of mountable media comprise linear media.

* * * * *